(12) United States Patent
Yamaoka

(10) Patent No.: US 10,081,359 B2
(45) Date of Patent: Sep. 25, 2018

(54) TRAVEL CONTROL DEVICE FOR VEHICLE

(71) Applicant: HONDA MOTOR CO., LTD., Minato-Ku, Tokyo (JP)

(72) Inventor: Yusuke Yamaoka, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

(21) Appl. No.: 15/003,132

(22) Filed: Jan. 21, 2016

(65) Prior Publication Data
US 2016/0214609 A1   Jul. 28, 2016

(30) Foreign Application Priority Data

Jan. 28, 2015 (JP) ................................ 2015-014216

(51) Int. Cl.
*B60W 30/16* (2012.01)
*B60Q 9/00* (2006.01)
(Continued)

(52) U.S. Cl.
CPC ............ *B60W 30/16* (2013.01); *B60Q 9/00* (2013.01); *B60W 30/0953* (2013.01); *B60W 30/0956* (2013.01); *B60W 30/18145* (2013.01); *B60W 30/18154* (2013.01); *B60W 2520/105* (2013.01); *B60W 2530/10* (2013.01); *B60W 2540/04* (2013.01); *B60W 2540/10* (2013.01); *B60W 2540/12* (2013.01); *B60W 2550/141* (2013.01); *B60W 2550/142* (2013.01); *B60W 2550/146* (2013.01); *B60W 2550/306* (2013.01); *B60W 2550/308* (2013.01)

(58) Field of Classification Search
None
See application file for complete search history.

(56) References Cited

U.S. PATENT DOCUMENTS

| 6,622,079 B2 | 9/2003 | Minowa et al. | |
| 8,957,772 B2* | 2/2015 | Mauderer | B60T 7/22 340/435 |

(Continued)

FOREIGN PATENT DOCUMENTS

| DE | 102005059688 A1 | 6/2007 |
| DE | 69837288 T2 | 11/2007 |

(Continued)

OTHER PUBLICATIONS

Search Report dated Sep. 30, 2016 issued over the corresponding German Patent Application No. 102016201196.0 with English translation.

(Continued)

*Primary Examiner* — Mussa A Shaawat
*Assistant Examiner* — Kyung J Kim
(74) *Attorney, Agent, or Firm* — Carrier Blackman & Associates, P.C.; Joseph P. Carrier; Jeffrey T. Gedeon

(57) ABSTRACT

As a rate of deceleration that is generated by an accelerator pedal of a user's own vehicle increases, a following vehicle inter-vehicular distance threshold, which is compared with a following vehicle inter-vehicular distance and serves as a reference for issuing a notification (illumination of a brake lamp) to a following vehicle, is made greater. Consequently, a notification controller notifies the following vehicle more quickly as the rate of deceleration of the user's own vehicle becomes larger.

8 Claims, 17 Drawing Sheets

(51) Int. Cl.
*B60W 30/095* (2012.01)
*B60W 30/18* (2012.01)

(56) References Cited

U.S. PATENT DOCUMENTS

| | | | |
|---|---|---|---|
| 2009/0134987 | A1 | 5/2009 | Oltmann et al. |
| 2014/0257665 | A1* | 9/2014 | Kagerer ............ B60K 31/0008 701/96 |

FOREIGN PATENT DOCUMENTS

| | | | |
|---|---|---|---|
| DE | 102006037015 A1 | 2/2008 |
| JP | H04215541 A | 8/1992 |
| JP | H05270313 A | 10/1993 |
| JP | H0948278 A | 2/1997 |
| JP | H0995222 A | 4/1997 |
| JP | 2000045800 A | 2/2000 |
| JP | 2011-255795 A | 12/2011 |
| JP | 2013159216 A | 8/2013 |

OTHER PUBLICATIONS

Office Action dated Jun. 28, 2016 issued over the corresponding Japanese Patent Application No. 2015-014216 with the English translation of pertinent portion.

\* cited by examiner

TRAVEL CONTROL DEVICE FOR VEHICLE

CROSS-REFERENCE TO RELATED APPLICATION

This application is based upon and claims the benefit of priority from Japanese Patent Application No. 2015-014216 filed on Jan. 28, 2015, the contents of which are incorporated herein by reference.

BACKGROUND OF THE INVENTION

Field of the Invention

The present invention relates to a travel control device for a vehicle for controlling acceleration and deceleration of a user's own vehicle responsive to an amount of operation of a single operating element.

Description of the Related Art

In Japanese Laid-Open Patent Publication No. 2011-255795 (hereinafter referred to as "JP2011-255795A"), a technology is disclosed in which an illumination control unit causes a brake lamp to be illuminated, if an inter-vehicular distance judgment unit judges that an inter-vehicular distance between a user's own vehicle and a following vehicle is shorter than a danger distance associated with a velocity of the user's own vehicle, during operation of regenerative braking when a driver of an electric vehicle steps off from, i.e., releases, the accelerator pedal of the user's own vehicle (see paragraphs [0031] through [0034] of JP2011-255795A).

SUMMARY OF THE INVENTION

In the foregoing manner, according to JP2011-255795A, during operation of regenerative braking, the brake lamp is caused to be illuminated in the event it is determined that the inter-vehicular distance between the user's own vehicle and the following vehicle is shorter than the danger distance. Therefore, assuming that the user's own vehicle is traveling on an uphill path or the like, even at times that the rate of deceleration of the user's own vehicle due to actually occurring regenerative braking is small, and a sufficient margin exists until a rear-end collision might occur, a concern exists in that the brake lamp is illuminated if the inter-vehicular distance between the user's own vehicle and the following vehicle becomes smaller than the danger distance, and thus an inconvenience is imparted to occupants such as the driver, etc., of the following vehicle, and there is room for improvement.

Further, in a vehicle in which a travel control device for the vehicle is incorporated, which controls acceleration and deceleration of a user's own vehicle responsive to an amount of operation of a single operating element, if the brake lamp is normally illuminated when a rate of deceleration occurs by operation of the operating element, regardless of the fact that there is a sufficient inter-vehicular distance between the user's own vehicle and the following vehicle taking into consideration the rate of deceleration that is occurring, a notification is issued to the following vehicle that deceleration is taking place, and in a similar manner, an inconvenience is imparted by excessive notification to occupants such as the driver, etc., of the following vehicle, and thus there is room for improvement.

Nevertheless, under certain traveling conditions, e.g., when traveling in a curve, it is still desirable to reduce the risk of the user's own vehicle being hit from behind by the following vehicle, in priority to the reduction of inconvenience which might be imparted to occupants such as the driver of the following vehicle.

The present invention has been devised taking into consideration the aforementioned problems, and has the object of providing a travel control device for a vehicle which, in a configuration that controls acceleration and deceleration of a user's own vehicle responsive to an amount of operation of a single operating element, is capable of appropriately notifying a following vehicle concerning braking of the user's own vehicle.

According to the present invention, a travel control device for a vehicle for controlling acceleration and deceleration of a user's own vehicle responsive to an amount of operation of a single operating element includes a following vehicle inter-vehicular distance detection unit configured to detect a following vehicle inter-vehicular distance, which is an inter-vehicular distance between the user's own vehicle and a following vehicle, a notifying unit configured to issue a notification to the following vehicle that the user's own vehicle is decelerating, a notification controller configured to control issuance of the notification by the notifying unit, in a case that the user's own vehicle is being decelerated by the operating element, and when the following vehicle inter-vehicular distance becomes equal to or less than a following vehicle inter-vehicular distance threshold, and a traveling controller configured to set in relation to the amount of operation, a deceleration region corresponding to the amount of operation in one direction by the operating element, and an acceleration region corresponding to the amount of operation in another direction that differs from the one direction, and configured to, in the deceleration region, control a rate of deceleration of the user's own vehicle so as to increase as the amount of operation in the one direction becomes greater. The notification controller is configured to set the following vehicle inter-vehicular distance threshold so as to increase as the amount of operation in the one direction by the operating element becomes greater, and as the rate of deceleration becomes greater.

According to this configuration, in a vehicle in which the rate of acceleration and deceleration is effected with a single operating element, as the deceleration rate generated by the operating element becomes greater, the following vehicle inter-vehicular distance threshold, which is compared with the following vehicle inter-vehicular distance and serves as a reference for issuing a notification to the following vehicle, is made larger, and therefore, a notification can be issued to the following vehicle more quickly as the rate of deceleration becomes greater. Consequently, the risk of the user's own vehicle being hit from behind by the following vehicle can be reduced. Further, since there is no need to carry out the notification at a faster timing than necessary, an inconvenience of excessively notifying a vehicle occupant such as the driver, etc., of the following vehicle can be reduced.

In this case, there may further be included an operating speed detecting unit configured to detect a speed of operation in the one direction of the operating element, and the notification controller may set the following vehicle inter-vehicular distance threshold so as to increase as the speed of operation in the one direction detected by the operating speed detecting unit becomes greater.

In accordance with this configuration, it is judged that a state of rapid deceleration is occurring if the speed of operation of the operating element in the one direction is fast, and by issuing the notification quickly at a position where the following vehicle inter-vehicular distance is comparatively long, the risk of the user's own vehicle being hit from behind by the following vehicle can be further reduced.

Further, if it is detected that the rate of deceleration, which is generated based on the operating element being operated in the one direction, has become greater than a deceleration rate threshold, prior to the following vehicle inter-vehicular distance becoming less than or equal to the following vehicle inter-vehicular distance threshold, the notification controller may carry out the notification by the notifying unit at a point in time it is detected that the rate of deceleration has become greater.

In accordance with this configuration, even in the case that the inter-vehicular distance between the user's own vehicle and the following vehicle is not less than or equal to the following vehicle inter-vehicular distance threshold, by issuing the notification to the following vehicle if the rate of deceleration generated by the operating element is greater than the deceleration rate threshold, since the fact that the user's own vehicle is decelerating significantly can be notified at an early stage, the risk of the user's own vehicle being hit from behind by the following vehicle can be further reduced.

In addition, there may further be included a gradient acquisition unit configured to acquire a road surface gradient, which is a gradient of a travel path along which the user's own vehicle travels. Further, in a case it is detected by the gradient acquisition unit that the travel path is an uphill path, the notification controller may set the following vehicle inter-vehicular distance threshold so as to decrease and/or the deceleration rate threshold so as to become larger as the road surface gradient of the uphill path becomes greater, and in a case it is detected by the gradient acquisition unit that the travel path is a downhill path, the notification controller may set the following vehicle inter-vehicular distance threshold so as to increase and/or the deceleration rate threshold so as to become smaller as the road surface gradient becomes greater.

According to this configuration, it is possible to issue a notification without discomfort, compared with a case that the vehicle is traveling on a flat road, even in cases that the vehicle is traveling on a sloped road where there is a gradient to the road surface.

Further still, a curve/intersection detecting unit may be included that detects a curve or an intersection in a forward direction of a travel path along which the user's own vehicle travels, and the notification controller may set the following vehicle inter-vehicular distance threshold so as to increase and/or the deceleration rate threshold so as to become smaller, in a case it is detected by the curve/intersection detecting unit that the curve or the intersection exists in the forward direction of the travel path along which the user's own vehicle travels.

In accordance with this configuration, since it is possible for the user's own vehicle to generate a rate of deceleration significantly at a curve or an intersection, by issuing the notification quickly with respect to the following vehicle, the risk of the user's own vehicle being hit from behind by the following vehicle can be reduced.

Further still, a preceding vehicle inter-vehicular distance detection unit may be included that detects a preceding vehicle inter-vehicular distance, which is an inter-vehicular distance between the user's own vehicle and a preceding vehicle, and the notification controller may set a preceding vehicle inter-vehicular distance threshold so as to increase and/or the deceleration rate threshold so as to become smaller, in a case that a frequency of the preceding vehicle inter-vehicular distance being less than the preceding vehicle inter-vehicular distance threshold is high, or in a case that a time for which the preceding vehicle inter-vehicular distance is less than the preceding vehicle inter-vehicular distance threshold is continued for a predetermined time interval or greater.

In accordance with this configuration, if the inter-vehicular distance between the user's own vehicle and the preceding vehicle is small, traffic congestion is assumed to exist in front of the user's own vehicle, and in this case, by issuing the notification quickly with respect to the following vehicle, the risk of the user's own vehicle being hit from behind by the following vehicle can be reduced.

Further still, there may be further included a vehicle weight acquisition unit configured to acquire a vehicle weight of the user's own vehicle, and as the vehicle weight that is acquired by the vehicle weight acquisition unit is lighter, the notification controller may performs at least one of settings: for setting the following vehicle inter-vehicular distance threshold so as to increase; for setting a deceleration rate threshold so as to become smaller; and for setting a preceding vehicle inter-vehicular distance threshold so as to decrease.

In accordance with this configuration, in the case that the vehicle weight of the user's own vehicle is light, although the operating element is operated in the same way, the rate of deceleration becomes greater. Therefore, by adjusting the threshold value, and thereby issuing a notification more quickly, the risk of the user's own vehicle being hit from behind by the following vehicle can be reduced.

According to the present invention, a travel control device for a vehicle for controlling acceleration and deceleration of a user's own vehicle responsive to an amount of operation of a single operating element includes a following vehicle inter-vehicular distance detection unit configured to detect a following vehicle inter-vehicular distance, which is an inter-vehicular distance between the user's own vehicle and a following vehicle, a relative velocity acquisition unit configured to acquire a relative velocity between the user's own vehicle and the following vehicle, a notifying unit configured to issue a notification to the following vehicle that the user's own vehicle is decelerating, a notification controller configured to control issuance of the notification by the notifying unit, in a case that the user's own vehicle is being decelerated by the operating element, and on condition that a time to collision, which is calculated from the following vehicle inter-vehicular distance and the relative velocity, is less than a time to collision threshold, and a traveling controller configured to set in relation to the amount of operation, a deceleration region corresponding to the amount of operation in one direction by the operating element, and an acceleration region corresponding to the amount of operation in another direction that differs from the one direction, and configured to, in the deceleration region, control a rate of deceleration of the user's own vehicle so as to increase as the amount of operation in the one direction becomes greater. The notification controller is configured to set the time to collision threshold so as to increase as the amount of operation in the one direction by the operating element becomes greater, and as the rate of deceleration becomes greater.

According to this configuration, in a vehicle in which the rate of acceleration and deceleration is effected with a single operating element, as the deceleration rate generated by the operating element becomes greater, the time to collision threshold, which is compared with the time to collision and serves as a reference for issuing a notification to the following vehicle, is made larger, and therefore, a notification can be issued to the following vehicle more quickly as the rate of deceleration becomes greater. Consequently, the risk of the user's own vehicle being hit from behind by the following vehicle can be reduced. Further, since there is no need to carry out the notification at a faster timing than necessary, an inconvenience of excessively notifying a vehicle occupant such as the driver, etc., of the following vehicle can be reduced.

According to the present invention, in a vehicle in which the rate of acceleration and deceleration is effected with a single operating element, as the deceleration rate generated by the operating element becomes greater, the inter-vehicular distance threshold, which is compared with the following vehicle inter-vehicular distance and serves as a reference for issuing a notification to the following vehicle, is made larger, and therefore, a notification can be issued to the following vehicle more quickly as the rate of deceleration becomes greater. Consequently, the risk of the user's own vehicle being hit from behind by the following vehicle can be reduced. Further, since there is no need to carry out the notification at a faster timing than necessary, an inconvenience of excessively notifying a vehicle occupant such as the driver, etc., of the following vehicle can be reduced.

Further, according to the present invention, in a vehicle in which the rate of acceleration and deceleration is effected with a single operating element, as the deceleration rate generated by the operating element becomes greater, the time to collision threshold, which is compared with the time to collision and serves as a reference for issuing a notification to the following vehicle, is made larger, and therefore, a notification can be issued to the following vehicle more quickly as the rate of deceleration becomes greater. Consequently, the risk of the user's own vehicle being hit from behind by the following vehicle can be reduced. Further, since there is no need to carry out the notification at a faster timing than necessary, an inconvenience of excessively notifying a vehicle occupant such as the driver, etc., of the following vehicle can be reduced.

In the foregoing manner, according to the present invention, in a configuration that controls acceleration and deceleration of a user's own vehicle responsive to an amount of operation of a single operating element, it is possible to appropriately notify a following vehicle concerning braking of the user's own vehicle.

The above and other objects, features, and advantages of the present invention will become more apparent from the following description when taken in conjunction with the accompanying drawings, in which preferred embodiments of the present invention is shown by way of illustrative example.

DESCRIPTION OF THE PREFERRED EMBODIMENTS

Below, a preferred embodiment of a travel control device for a vehicle according to an embodiment of the present invention will be described in detail with reference to the accompanying drawings.

First Exemplary Embodiment

Figure 1:
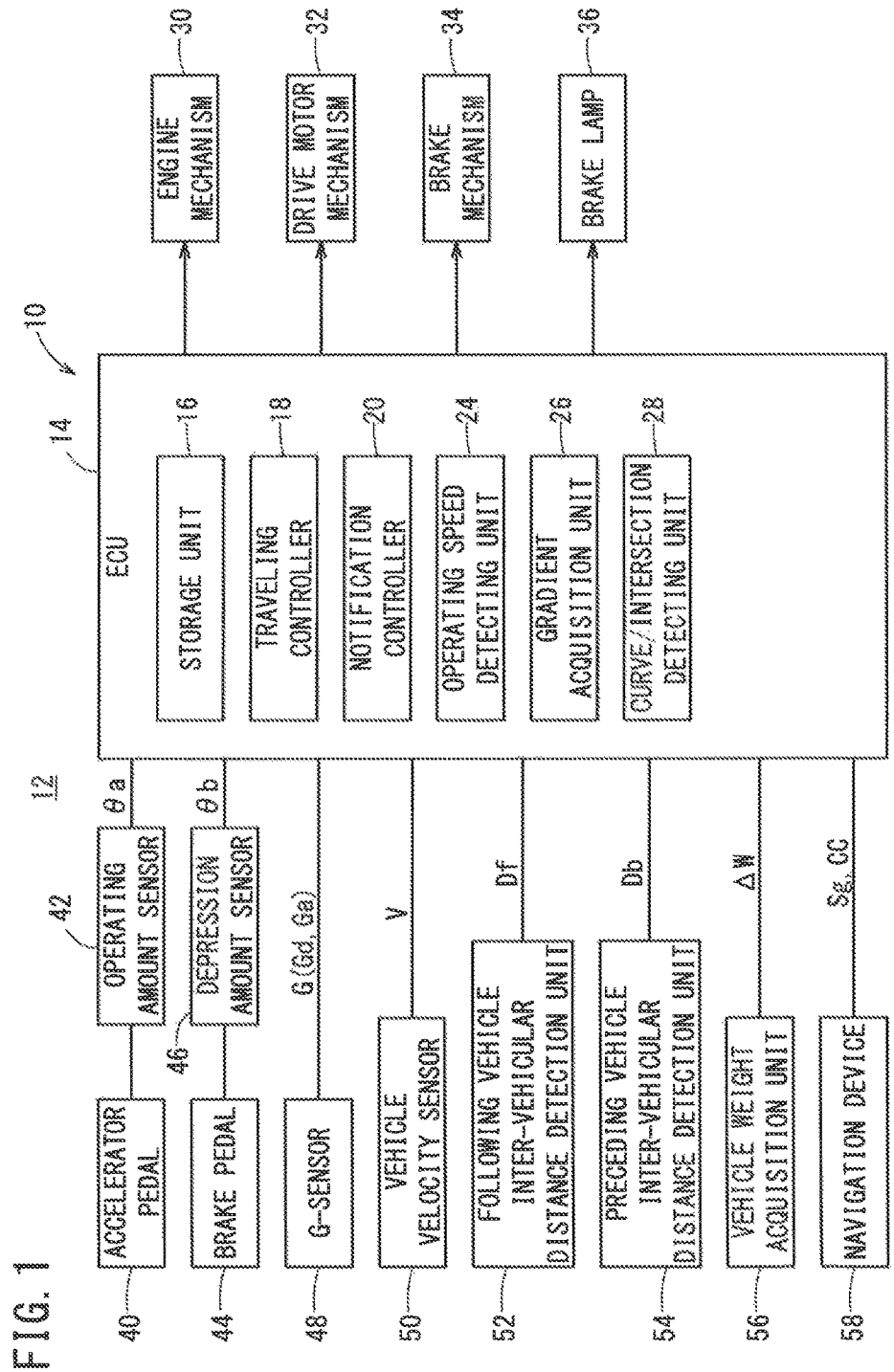
FIG. 1 is a structural block diagram shown in outline of a user's own vehicle in which there is incorporated a travel control device for a vehicle according to a first embodiment of the present invention.

FIG. 1 is a structural block diagram showing in outline a user's own vehicle 12 in which there is incorporated a travel control device 10 for a vehicle according to a first embodiment of the present invention.

Figure 2:
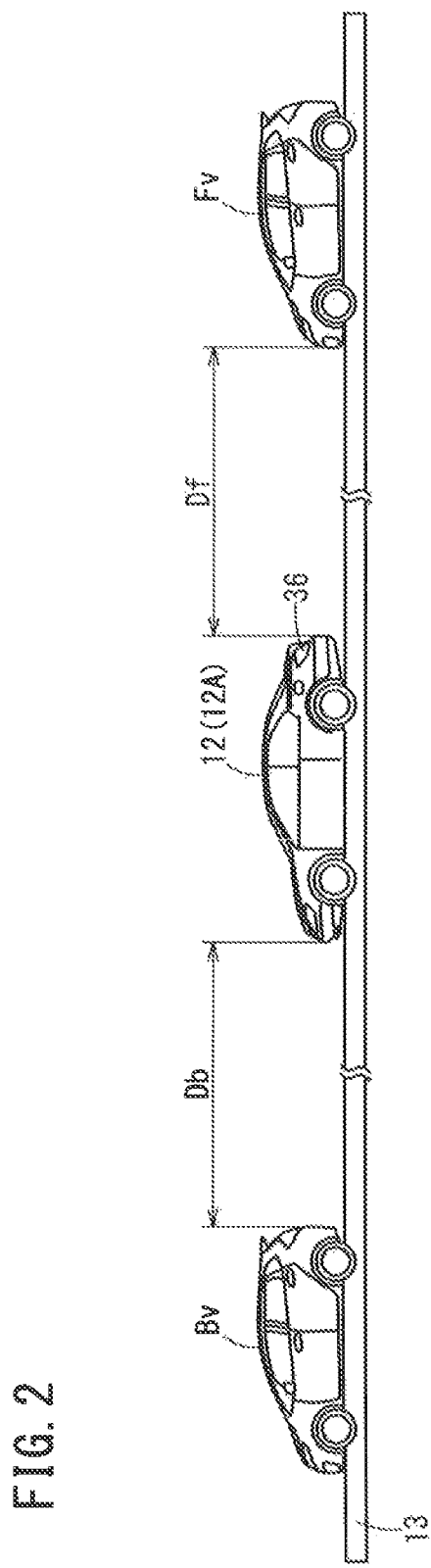
FIG. 2 is a schematic traveling state diagram showing a user's own vehicle that is traveling along a travel path, and a preceding vehicle and a following vehicle that are traveling in the same direction as a user's own vehicle.

FIG. 2 is a schematic traveling state diagram showing the user's own vehicle 12 that is traveling along a road (road surface or travel path) 13, a preceding vehicle Bv that is traveling in the same direction as the user's own vehicle 12 in front of the user's own vehicle 12, and a following vehicle Fv that is traveling in the same direction as the user's own vehicle 12 rearwardly of the user's own vehicle 12.

In the present embodiment, the user's own vehicle 12 is a hybrid vehicle. However, the present invention is not limited to a hybrid vehicle, and the principles of the invention can be applied to an engine-driven vehicle, a fuel cell vehicle, an electric vehicle, or the like.

As shown in FIG. 1, the travel control device 10 for a vehicle is equipped with an ECU (electronic control unit) 14. As is well known, the ECU 14 is a computational device including a microcomputer, which in addition to a CPU (central processing unit), a ROM (including an EEPROM) and a RAM (random access memory) that serve as a storage unit 16, includes input/output devices such as an A/D converter, a D/A converter, etc., and a timer as a timing unit and the like. The CPU functions as various function realizing sections (function realizing means), for example, a controller, a calculating unit, and a processing unit, etc., that read out and execute programs stored in the ROM. Such functions can also be implemented by hardware components. Further, the ECU 14 can be integrated into an individual unit, or can be divided across multiple units.

In the first embodiment, the ECU 14, in addition to the aforementioned storage unit 16, as more specific various function realizing sections (function realizing means) thereof, further comprises a traveling controller 18, a notification controller 20, an operating speed detecting unit 24, a gradient acquisition unit 26, and a curve/intersection detecting unit 28.

To the ECU 14, as respective output devices, there are connected an engine mechanism 30, a drive motor mechanism 32, a brake mechanism 34, and a brake lamp (notifying unit) 36.

To the ECU 14, as respective input devices, there are connected an operating amount sensor 42, which is connected to an accelerator pedal (acceleration/deceleration pedal) 40, a depression amount sensor 46, which is connected to a brake pedal 44, a G-sensor 48, a vehicle velocity sensor 50, a following vehicle inter-vehicular distance detection unit 52, a preceding vehicle inter-vehicular distance detection unit 54, a vehicle weight acquisition unit 56, and a navigation device 58.

The accelerator pedal 40, as will be discussed later, differs from an ordinary accelerator pedal, which only has an acceleration region, in that the accelerator pedal 40 also includes a deceleration region in addition to the acceleration region.

The engine mechanism 30 includes an engine and a transmission, and transmits a drive force to the vehicle wheels. The engine is a drive source for the user's own vehicle 12.

The drive motor mechanism 32 includes a drive motor, which is driven through an inverter, and a battery that supplies power through the inverter to the drive motor. It is possible for regenerative braking to be actuated by the drive motor (drive motor mechanism 32).

The brake mechanism 34 is equipped with structural elements such as a hydraulic system, brake pads, and the like, and imparts frictional braking forces upon coming into contact with the vehicle wheels. It is thus possible for frictional braking to be operated by the brake mechanism 34.

The operating amount sensor 42 detects an amount of operation θa [deg] from an origin position, or a so-called totally closed position, of the accelerator pedal 40, and outputs the detected amount to the ECU 14.

The depression amount sensor 46 detects an amount of depression θb [deg] from an origin position of the brake pedal 44, and outputs the detected amount to the ECU 14.

The G-sensor 48 detects the acceleration (rate of acceleration and deceleration) G in a forward and rearward direction of the user's own vehicle 12 (rate of deceleration Gd<0, rate of acceleration Ga>0) [m/s$^2$], and outputs the detected acceleration or deceleration to the ECU 14. The rate of deceleration Gd (negative value) becoming greater is signified by an absolute value |Gd| of the rate of deceleration Gd becoming greater. Conversely, the rate of deceleration Gd becoming smaller is signified by the absolute value |Gd| of the rate of deceleration Gd becoming smaller.

The vehicle velocity sensor 50 detects a velocity V [km/h] of the user's own vehicle 12, and outputs the detected velocity to the ECU 14.

The following vehicle inter-vehicular distance detection unit 52 detects a following vehicle inter-vehicular distance Df [m] from an output that includes the following vehicle Fv from a radar, a laser, or a vehicle-mounted camera installed on a rear portion of the user's own vehicle 12, or an output from the following vehicle Fv obtained by a vehicle-to-vehicle communications device, or an output from a beacon obtain by a road-to-vehicle communications device, and outputs the detected distance to the ECU 14.

The preceding vehicle inter-vehicular distance detection unit 54 detects a preceding vehicle inter-vehicular distance Db [m] from an output that includes the preceding vehicle Bv from a radar, a laser, or a vehicle-mounted camera installed on a front grill or the like of the user's own vehicle 12, or an output from the preceding vehicle Bv obtained through a vehicle-to-vehicle communications device of the user's own vehicle 12, or an output from a beacon obtained through a road-to-vehicle communications device of the user's own vehicle 12, and outputs the detected distance to the ECU 14.

The vehicle weight acquisition unit 56 calculates a corrective weight amount ΔW [kg] to be added to the vehicle weight Wv [kg] from a seat sensor, a seat belt connection sensor, a vehicle height sensor, or a front lamp automatic leveling correction amount, and outputs the same to the ECU 14. Calculation of the corrective weight amount ΔW [kg] may be performed by the notification controller 20, etc. In this case, the vehicle weight Wv of the user's own vehicle 12 is stored beforehand in the storage unit 16.

The navigation device 58 includes map data and a current location detector such as a GPS (Global Positioning System) device or the like, detects a road surface gradient Sg [deg] of the road surface 13 on the travel path of the user's own vehicle 12, and the presence or absence of information, i.e., curve/intersection CC (CC=1: a curve or an intersection exists, CC=0: there is no curve or intersection), concerning a curve or an intersection in the forward direction of the travel path of the user's own vehicle 12, and outputs such information to the ECU 14. The road surface gradient Sg and the curve/intersection CC can also be acquired from an external information supply center through a portable terminal such as a smartphone or the like, which is connected to a vehicle-mounted communications device.

Figure 3:
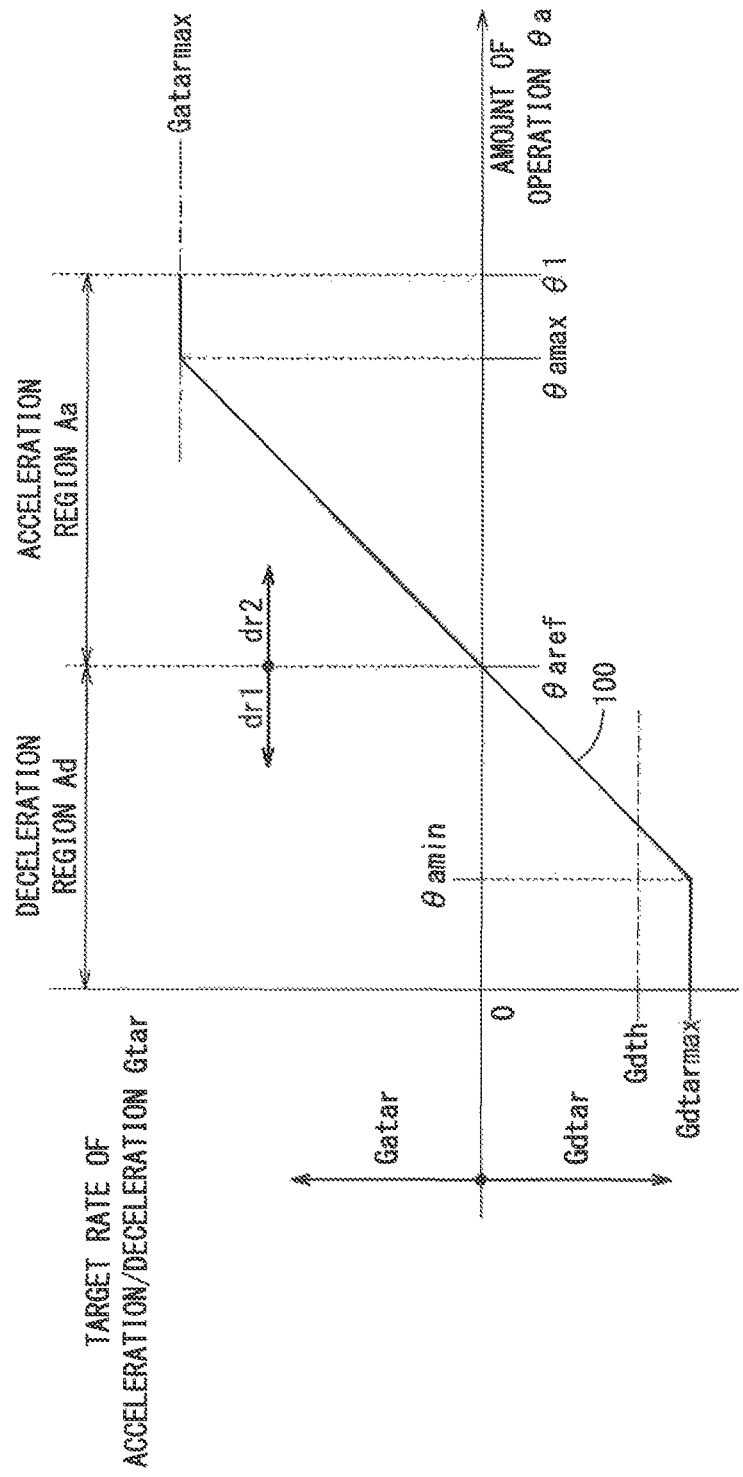
FIG. 3 is a basic characteristic diagram of changes in a target acceleration/deceleration rate with respect to an amount of operation of an accelerator pedal.

As shown by the basic characteristics 100 of the operating amount and target rate of acceleration/deceleration of FIG. 3 (also referred to as the operating amount and target acceleration/deceleration basic characteristics), the traveling controller 18 sets, in relation to the amount of operation θa, a deceleration region Ad corresponding to the amount of operation θa by the accelerator pedal 40 being an amount of operation (θaref−θa) becoming less in one direction dr1 from a reference amount of operation θaref (in this case, θa assumes a value from the reference amount of operation θaref to zero value), and an acceleration region Aa corresponding to the amount of operation θa by the accelerator pedal 40 being an amount of operation θa in another direction dr2 from the reference amount of operation θaref that differs from the one direction dr1 (in this case, θa assumes a value from the reference amount of operation θaref to the amount of operation θ1).

The traveling controller 18 controls the drive output of the engine mechanism 30 and/or the drive motor mechanism 32 such that, in the deceleration region Ad, the rate of deceleration Gd of the user's own vehicle 12 increases as the amount of operation (θaref−θa) in the one direction dr1 from the reference amount of operation θaref becomes greater. On the other hand, the traveling controller 18 controls the drive output of the engine mechanism 30 and/or the drive motor mechanism 32 such that, in the acceleration region Aa, the rate of acceleration Ga of the user's own vehicle 12 increases as the amount of operation θa in the other direction dr2 becomes greater.

Moreover, concerning the basic characteristics 100 of the operating amount and target rate of acceleration/deceleration, multiple characteristics are stored beforehand in the storage unit 16 with the vehicle velocity V taken as a parameter thereof.

The operating amount θa being equal to zero degrees (θa=0 [deg]) implies an origin point (also referred to as θ0=0) of the accelerator pedal 40, which is regulated by a return spring and a stopper.

In the basic characteristics 100 of the operating amount and the target rate of acceleration/deceleration, the amount of operation θa of the accelerator pedal 40 from θa=0 (=θ0) to the amount of operation θamin is an area of play in which a target deceleration Gdtar is set to a maximum deceleration Gdtarmax, from the amount of operation θamin to the reference amount of operation θaref is an area in which the target deceleration Gdtar gradually decreases from the maximum deceleration Gdtarmax to a zero value, from the reference amount of operation θaref to the amount of operation θamax is an area in which the target acceleration Gatar gradually increases from a zero value to a maximum acceleration Gatarmax, and the amount of operation θa from θa=θamax to the amount of operation θ1 is an area of play in which the target acceleration Gatar is set to a maximum acceleration Gatarmax.

Basically, in the case that the amount of operation θa, which is being decelerated by the accelerator pedal 40, lies within the deceleration region Ad (0≤θa<θaref), when the following vehicle inter-vehicular distance Df becomes less than or equal to the following vehicle inter-vehicular distance threshold Dfth that has been stored beforehand in the storage unit 16, the notification controller 20 illuminates the brake lamp 36 for notifying the driver, etc., of the following vehicle Fv that the user's own vehicle 12 is currently decelerating, and in the case that the amount of operation θa lies within the acceleration region Aa (θaref≤θa≤θ1), the notification controller 20 extinguishes (does not illuminate) the brake lamp 36.

The operating speed detecting unit 24 detects a speed of operation Pv in the one direction dr1 of the accelerator pedal 40. The speed of operation Pv is detected as an amount of change per unit time of the amount of operation (θaref−θa). More specifically, assuming the value Δt to be a minute known time interval, the speed of operation Pv is calculated as shown in equation (1).

$$Pv=(θaref−θa)/Δt[deg/s] \quad (1)$$

The gradient acquisition unit 26 acquires from the navigation device 58 the road surface gradient Sg, which is a gradient of the travel path 13 along which the user's own vehicle 12 travels.

The curve/intersection detecting unit 28 detects from the navigation device 58 a curve/intersection CC in the forward direction along the travel path 13 of the user's own vehicle 12.

Operations of the travel control device 10 for a vehicle according to the first embodiment of the present invention, which is constructed basically as described above and is incorporated in the user's own vehicle 12, will be described with reference to the flowchart of FIG. 4. In the following description, the execution subject of the program according to the flowchart is the notification controller 20 of the ECU 14.

First, in step S1, the notification controller 20 of the user's own vehicle 12, which is currently traveling in the condition shown in FIG. 2, detects an amount of operation θa of the accelerator pedal 40 through the operating amount sensor 42, and in step S2, detects whether or not the detected amount of operation θa lies within the deceleration region Ad (0≤θa<θaref) which is less than the reference amount of operation θaref. In the case that the amount of operation θa is greater than the reference amount of operation θaref (θa≥θaref) and is not within the deceleration region Ad (step S2: NO, θa≥θaref), i.e., if the amount of operation θa lies within the acceleration region Aa, the procedure returns to step S1.

In the case that the amount of operation θa is less than the reference amount of operation θaref (θa<θaref) and is within the deceleration region Ad (step S2: YES), then in step S3, the notification controller 20 detects the rate of deceleration Gd of the user's own vehicle 12 through the G-sensor 48.

Figure 5:
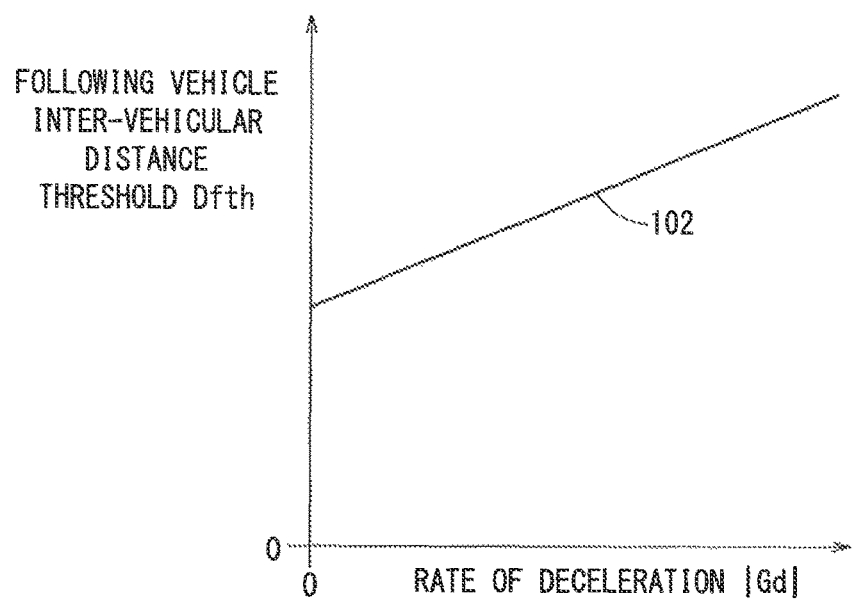
FIG. 5 is a following vehicle inter-vehicular distance threshold characteristic diagram, showing changes in a following vehicle inter-vehicular distance threshold with respect to deceleration.

Next, in step S4, the notification controller 20, with reference to the characteristic (map) 102 of the following vehicle inter-vehicular distance threshold Dfth with respect to the absolute value |Gd| of the rate of deceleration Gd shown in FIG. 5, calculates the following vehicle inter-vehicular distance threshold Dfth corresponding to the rate of deceleration Gd that was detected in step S3.

The characteristic 102 of the following vehicle inter-vehicular distance threshold Dfth is stored beforehand in the storage unit 16 with the vehicle velocity V as a parameter thereof. The characteristic 102 is set such that the following vehicle inter-vehicular distance threshold Dfth is made greater as the amount of operation |θaref−θa| in the one direction dr1 by the accelerator pedal 40 becomes greater, and as the rate of deceleration Gd (absolute value |Gd|) becomes greater.

Next, in step S5, the notification controller 20 carries out a ratio correction of the following vehicle inter-vehicular distance Dfth in accordance with a correction ratio Rx, based on the following formula (2). Note that, in the first embodiment, the correction ratio Rx is set to Rx=1.

$$Dfth←Dfth×Rx \quad (2)$$

Next, in step S6, the notification controller 20 detects, through the following vehicle inter-vehicular distance detection unit 52, the following vehicle inter-vehicular distance Df, which is the inter-vehicular distance between the user's own vehicle 12 and the following vehicle Fv.

Next, in step S7, the notification controller 20 compares the detected following vehicle inter-vehicular distance Df with the size of the following vehicle inter-vehicular distance threshold Dfth, and judges whether or not the following vehicle inter-vehicular distance Df is smaller (shorter) than the following vehicle inter-vehicular distance threshold Dfth (Df≤Dfth).

In the judgment of step S7, if the following vehicle inter-vehicular distance Df is greater (longer) than the following vehicle inter-vehicular distance threshold Dfth (Df>Dfth) (step S7: NO), then it is judged that a troublesome excessive notification would result, nothing is done, and the procedure returns to step S1.

On the other hand, in the judgment of step S7, if the following vehicle inter-vehicular distance Df is smaller (shorter) than the following vehicle inter-vehicular distance threshold Dfth (Df≤Dfth) (step S7: YES), then in step S8, the notification controller 20 issues a notification by causing the brake lamp 36 to be illuminated, thus prompting the attention of the driver, etc., of the following vehicle Fv that the user's own vehicle 12 (the vehicle in front of the following vehicle Fv) is currently in a decelerating state.

As has been described above, the travel control device 10 for a vehicle according to the aforementioned first embodiment controls the acceleration and deceleration of the user's own vehicle 12 responsive to the amount of operation θa of the accelerator pedal 40, which acts as a single operating element. More specifically, concerning the amount of operation θa, the traveling controller 18 sets the deceleration region Ad corresponding to the amount of operation (θaref−θa) in the one direction dr1 by the accelerator pedal 40, and the acceleration region Aa corresponding to the amount of operation (θa−θaref) in the other direction dr2 that differs from the one direction dr1, and within the deceleration region Ad, controls the rate of deceleration Gd (target deceleration Gdtar) of the user's own vehicle 12 so as to increase as the amount of operation (θaref−θa) in the one direction dr1 becomes greater.

In addition, in the travel control device 10 for a vehicle according to the first embodiment, the following vehicle inter-vehicular distance detection unit 52 detects the following vehicle inter-vehicular distance Df, which is the inter-vehicular distance between the user's own vehicle 12 and the following vehicle Fv. In this case, in principal, in a state in which the brake pedal 44 is depressed and a non-illustrated brake switch is turned on, the brake lamp 36 acting as a notifying unit is illuminated if the user's own vehicle is currently undergoing deceleration, and a notification is issued to the following vehicle Fv that the user's own vehicle 12 is decelerating. Furthermore, basically, in the case it is detected that the user's own vehicle 12 is being decelerated by the accelerator pedal 40, then if the following vehicle inter-vehicular distance Df becomes less than or equal to the following vehicle inter-vehicular distance threshold Dfth, the notification controller 20 illuminates the brake lamp 36.

In addition, the notification controller 20 is set such that the following vehicle inter-vehicular distance threshold Dfth is made greater as the amount of operation |θaref−θa| in the one direction dr1 by the accelerator pedal 40 becomes greater, and as the rate of deceleration Gd (absolute value |Gd|) becomes greater.

According to the above-described configuration, in the user's own vehicle 12 in which acceleration and deceleration is effected with the single accelerator pedal 40, as the rate of deceleration Gd generated by the accelerator pedal 40 becomes greater, the following vehicle inter-vehicular distance threshold Dfth, which is compared with the following vehicle inter-vehicular distance Df and serves as a reference for issuing a notification (illuminating the brake lamp 36) with respect to the following vehicle Fv, is made larger, and therefore, a notification can be issued to the following vehicle Fv more quickly as the rate of deceleration Gd becomes greater. Consequently, the risk of the user's own vehicle 12 being hit from behind by the following vehicle Fv can be reduced. Further, since there is no need to carry out the notification at a faster timing than necessary, an inconvenience of excessively notifying a vehicle occupant such as the driver, etc., of the following vehicle Fv can be reduced. In this manner, according to the first embodiment, in a configuration that controls acceleration and deceleration of the user's own vehicle 12 responsive to the amount of operation θa of the single accelerator pedal 40, it is possible to appropriately notify the following vehicle Fv concerning braking of the user's own vehicle 12.

First Modification of First Embodiment

Figure 6:
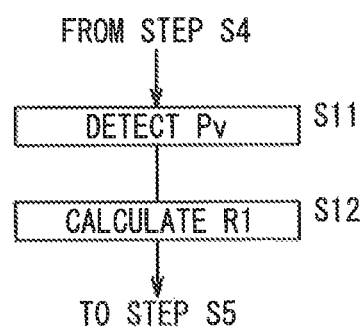
FIG. 6 is a flowchart for describing operations (in relation to speed of operation of the accelerator pedal) according to a first modification of the first embodiment.

Next, operations of the travel control device 10 for a vehicle according to a first modification of the first embodiment of the present invention will be described with reference to the flowchart of FIG. 6. The processes of steps S11 and S12 shown in the flowchart of FIG. 6 are processes that take place between the process of step S4 and the process of step S5 of the flowchart shown in FIG. 4.

In step S4, as noted previously, the characteristic 102 (see FIG. 5) is referred to by the notification controller 20, and the following vehicle inter-vehicular distance threshold Dfth corresponding to the rate of deceleration Gd of the user's own vehicle 12 is calculated.

According to the first modification, next in step S11, as was described with reference to equation (1) above, the operating speed detecting unit 24 detects the speed of operation Pv in the one direction dr1 of the accelerator pedal 40 as Pv=(θaref−θa)/Δt [deg/s].

Figure 7:
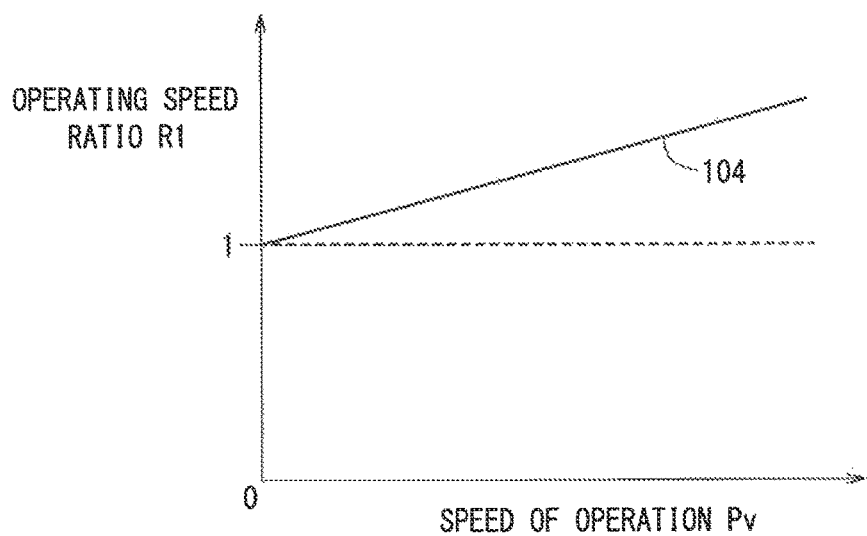
FIG. 7 is a characteristic diagram showing changes in an operating speed ratio with respect to the speed of operation.

Next, in step S12, the notification controller 20, with reference to the characteristic (map) 104 of the operating speed ratio R1 with respect to the speed of operation Pv shown in FIG. 7, calculates the operating speed ratio R1 corresponding to the speed of operation Pv.

The characteristic 104 of the operating speed ratio R1 is stored beforehand in the storage unit 16 with the vehicle velocity V as a parameter thereof. The characteristic 104 is set such that the operating speed ratio R1 is made larger than the value 1 so that the following vehicle inter-vehicular distance threshold Dfth is made greater, as the speed of operation Pv in the one direction dr1 by the accelerator pedal 40, which is detected by the operating speed detecting unit 24, becomes greater.

More specifically, after the calculation process of the operating speed ratio R1 in step S12 is completed, the correction ratio Rx of formula (2) in step S5 is set to Rx=R1>1, and the value of the following vehicle inter-vehicular distance threshold Dfth is made greater according to the formula Dfth←Dfth×Rx=Dfth×R1.

In accordance with the first modification of the first embodiment, it is judged that a state of rapid deceleration is occurring if the speed of operation Pv of the accelerator pedal 40 in the one direction dr1 is fast, and by the following vehicle inter-vehicular distance threshold Dfth, as a reference value that is adopted by the determination of step S7 (Df Dfth), being made greater (longer), the notification (illumination of the brake lamp 36) can be carried out quickly, and as a result, the risk of the user's own vehicle 12 being hit from behind by the following vehicle Fv can be further reduced.

Second Modification of First Embodiment

Next, operations of the travel control device 10 for a vehicle according to a second modification of the first embodiment of the present invention will be described with reference to the flowchart of FIG. 8.

Figure 8:
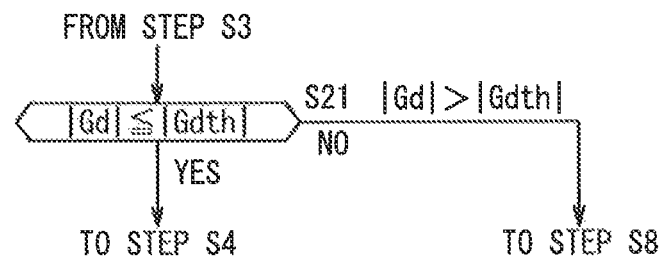
FIG. 8 is a flowchart for describing operations (in relation to rate of deceleration) according to a second modification of the first embodiment.

The process of step S21 shown in the flowchart of FIG. 8 is a process that takes place directly below the process of step S3 of the flowchart shown in FIG. 4.

In step S3, as noted above, the notification controller 20 detects the rate of deceleration Gd of the user's own vehicle 12 through the G-sensor 48.

According to the second modification, next, in step S21, the notification controller 20 judges whether or not the rate of deceleration Gd, which was detected in step S3 and is generated based on operation of the accelerator pedal 40 in the one direction Dr1, is smaller than a deceleration rate threshold Gdth (|Gd|≤|Gdth|).

In this case, the deceleration rate threshold Gdth is stored beforehand in the storage unit 16 with the vehicle velocity V, etc., as a parameter thereof, for example, and is set to a maximum target deceleration Gdtarmax, which is a maximum value of the target deceleration Gdtar of the basic characteristic 100 shown in FIG. 3, or to a deceleration rate threshold Gdth shown in FIG. 3 that is near to the maximum target deceleration Gdtarmax.

If the judgment of step S21 is affirmative (step S21: YES), then the processes of step S4 and those thereafter are implemented.

If the judgment of step S21 is negative (step S21: NO), more specifically, if it is detected that the rate of deceleration Gd has become larger than the deceleration rate threshold Gdth (|Gd|>|Gdth|), then at that point in time, in step S8, the brake lamp 36 is illuminated.

In accordance with the second modification of the first embodiment, even in the case that the following vehicle inter-vehicular distance Df, which is the distance between the user's own vehicle 12 and the following vehicle Fv, is not less than or equal to the following vehicle inter-vehicular distance threshold Dfth (i.e., prior to the following vehicle inter-vehicular distance Df becoming equal to or less than the following vehicle inter-vehicular distance threshold Dfth), the notification (illuminating the brake lamp 36) is issued to the following vehicle Fv if the rate of deceleration Gd generated by the accelerator pedal 40 is greater than the deceleration rate threshold Gdth. Therefore, since the fact that the user's own vehicle 12 is decelerating significantly can be notified at an early stage to the driver, etc., of the following vehicle Fv, the risk of the user's own vehicle 12 being hit from behind by the following vehicle Fv can be further reduced.

Third Modification of First Embodiment

Next, operations of the travel control device 10 for a vehicle according to a third modification of the first embodiment of the present invention will be described with reference to the flowchart of FIG. 9.

Figure 4:
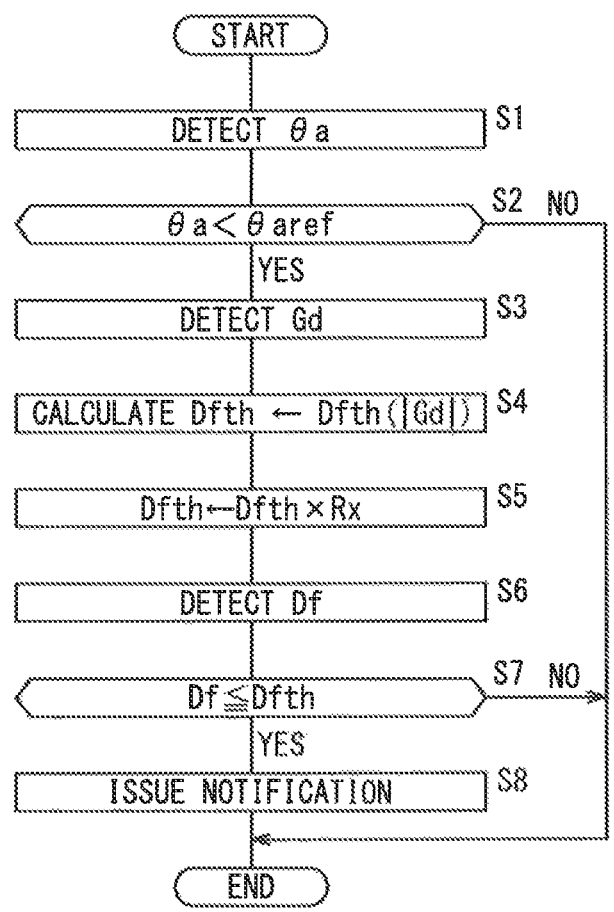
FIG. 4 is a flowchart for describing operations of the first embodiment.
Figure 9:
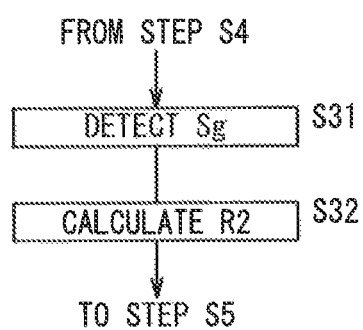
FIG. 9 is a flowchart for describing operations (in relation to road surface gradient) according to a third modification of the first embodiment.

The processes of steps S31 and S32 shown in the flowchart of FIG. 9 are processes that take place between the process of step S4 and the process of step S5 of the flowchart shown in FIG. 4.

In step S4, as noted previously, the following vehicle inter-vehicular distance threshold Dfth corresponding to the rate of deceleration Gd of the user's own vehicle 12 is calculated.

According to the third modification, in step S31, the gradient acquisition unit 26 acquires, from road surface gradient information contained within the map data of the navigation device 58, the road surface gradient Sg, which is a gradient of the travel path 13 along which the user's own vehicle 12 travels. The road surface gradient Sg can also be acquired externally by way of an information supply center or by way of road-to-vehicle communications through the aforementioned vehicle-mounted communications device. The road surface gradient Sg can also be detected by incorporating an inclination sensor in the user's own vehicle 12 and using such an inclination sensor.

Figure 10:
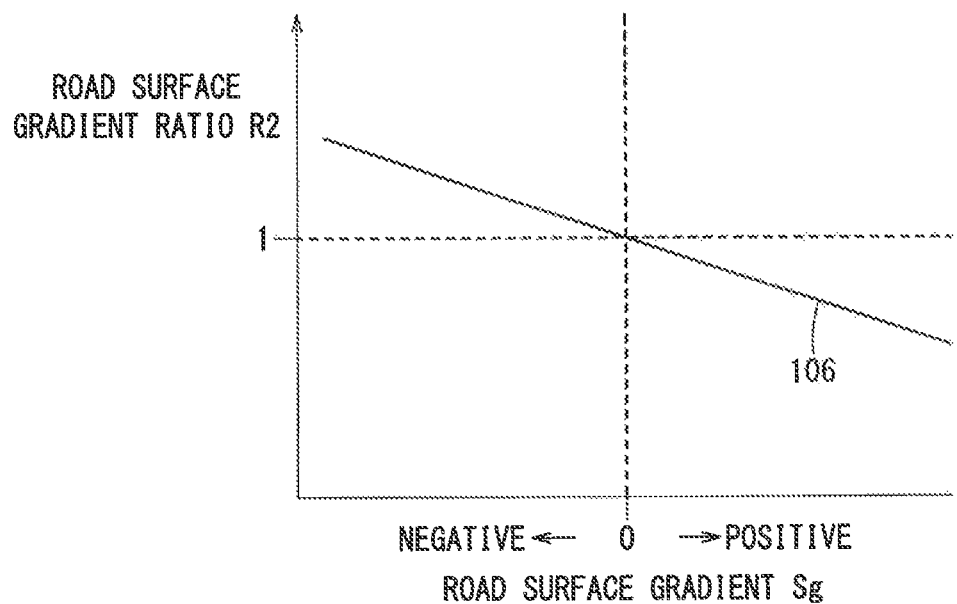
FIG. 10 is a characteristic diagram showing changes in a road surface gradient ratio with respect to the road surface gradient.

Next, in step S32, the notification controller 20, with reference to the characteristic (map) 106 of a road surface gradient ratio R2 with respect to the road surface gradient Sg shown in FIG. 10, calculates the road surface gradient ratio R2 corresponding to the road surface gradient Sg.

The characteristic 106 of the road surface gradient ratio R2 is stored beforehand in the storage unit 16 with the vehicle velocity V as a parameter thereof. The characteristic 106 is set such that, in the event that the road surface gradient Sg detected by the gradient acquisition unit 26 is a positive value (Sg>0), and if the travel path 13 is identified (detected) as being an uphill path, the road surface gradient ratio R2 is set to become less than the value 1 as the uphill path road surface gradient Sg (Sg>0) becomes larger, whereas in the event that the road surface gradient Sg detected by the gradient acquisition unit 26 is a negative value (Sg<0), and if the travel path 13 is identified (detected) as being an downhill path, the road surface gradient ratio R2 is set to become greater than the value 1 as (the absolute value |Sg| of) the road surface gradient Sg (Sg<0) becomes larger.

In this case, the correction ratio Rx of formula (2) in step S5 is set to Rx=R2, and as the uphill path road gradient Sg (Sg>0) becomes greater, the following vehicle inter-vehicular distance threshold Dfth is set so that the formula Dfth←Dfth>Rx=Dfth×R2 (R2<1) is satisfied, and the distance threshold Dfth becomes smaller (shorter) than the normal (flat road) following vehicle inter-vehicular distance threshold Dfth, and so that as the (absolute value |Sg|) of the downhill path road gradient Sg (Sg<0) becomes greater, the following vehicle inter-vehicular distance threshold Dfth is set so that the formula Dfth←Dfth×Rx=Dfth×R2 (R2>1) is satisfied, and the distance threshold Dfth becomes larger (longer) than the normal (flat road) following vehicle inter-vehicular distance threshold Dfth.

Therefore, in the judgment of step S7, in the case of an uphill path, the notification in step S8 is carried out with the following vehicle inter-vehicular distance Df being shorter than the following vehicle inter-vehicular distance Df on a flat road, whereas, in the case of a downhill path, the notification is carried out with the following vehicle inter-vehicular distance Df being longer than the following vehicle inter-vehicular distance Df on a flat road. Thus, when traveling on an inclined road in which the road surface as the travel path 13 has a gradient, a notification can be issued without discomfort, compared with cases that the vehicle is traveling on a flat road.

According to the third modification, in the event that the road surface gradient Sg detected by the gradient acquisition unit 26 is a positive value (Sg>0), and that the travel path 13 is identified (detected) as being an uphill path, the absolute value |Gdth| of the aforementioned deceleration rate threshold Gdth may be set to become larger as the uphill path road surface gradient Sg (Sg>0) becomes larger, whereas in the event that the road surface gradient Sg detected by the gradient acquisition unit 26 is a negative value (Sg<0), and that the travel path 13 is identified (detected) as being an downhill path, the absolute value |Gdth| of the deceleration rate threshold Gdth may be set to become smaller as the (absolute value |Sg|) of the road surface gradient Sg (Sg<0) becomes larger. In this case as well, even at times that the vehicle is traveling on a sloped road where there is a gradient to the road surface as the travel path 13, it is possible to issue a notification without discomfort, compared with times that the vehicle is traveling on a flat road.

Fourth Modification of First Embodiment

Next, operations of the travel control device 10 for a vehicle according to a fourth modification of the first embodiment of the present invention will be described with reference to the flowchart of FIG. 11.

Figure 11:
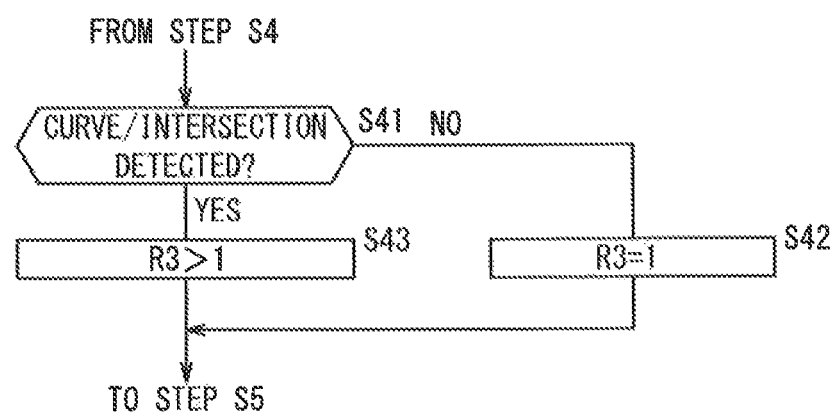
FIG. 11 is a flowchart for describing operations (in relation to a curve or an intersection) according to a fourth modification of the first embodiment.

The processes of steps S41, S42, and S43 shown in the flowchart of FIG. 11 are processes that take place between the process of step S4 and the process of step S5 of the flowchart shown in FIG. 4.

In step S4, as noted previously, the following vehicle inter-vehicular distance threshold Dfth corresponding to the rate of deceleration Gd of the user's own vehicle 12 is calculated.

According to the fourth modification, in step S41, the curve/intersection detecting unit 28 acquires, from curve/intersection information contained within the map data of the navigation device 58, whether or not there is a curve or an intersection in the forward direction of the travel path 13 along which the user's own vehicle 12 travels. The curve or intersection can also be acquired externally by way of an information supply center or by way of road-to-vehicle communications through the aforementioned vehicle-mounted communications device. Further, the curve or intersection can be detected by a vehicle-mounted camera.

If no curve or intersection is detected (step S41: NO), then a curve/intersection detection ratio R3 is set to R3=1 (step S42), and the processes of step S5 and those thereafter are performed.

If a curve or an intersection is detected (step S41: YES), the curve/intersection detection ratio R3 is set to a value more than 1 (R3>1) (step S43).

As a result, the value of the following vehicle inter-vehicular distance threshold Dfth is made larger, according to the formula Dfth×Rx=Dfth×R3 (R3>1).

In accordance with the fourth modification, considering that it is possible for the user's own vehicle 12 to generate a rate of deceleration Gd significantly at a curve or an intersection, the following vehicle inter-vehicular distance threshold Dfth is made larger (step S7: YES) for the purpose of illuminating the brake lamp 36 and issuing the notification (step S8). Therefore, by issuing the notification quickly with respect to the following vehicle Fv, the risk of the user's own vehicle 12 being hit from behind by the following vehicle Fv can be reduced.

Further, in the fourth modification as well, in the case that a curve or an intersection is detected, by setting the absolute value |Gdth| of the deceleration rate threshold Gdth so as to become smaller, since the fact that the user's own vehicle 12 is decelerating significantly can be notified at an early stage, the risk of the user's own vehicle 12 being hit from behind by the following vehicle Fv can be further reduced.

Fifth Modification of First Embodiment

Next, operations of the travel control device 10 for a vehicle according to a fifth modification of the first embodiment of the present invention will be described with reference to the flowchart of FIG. 12.

Figure 12:
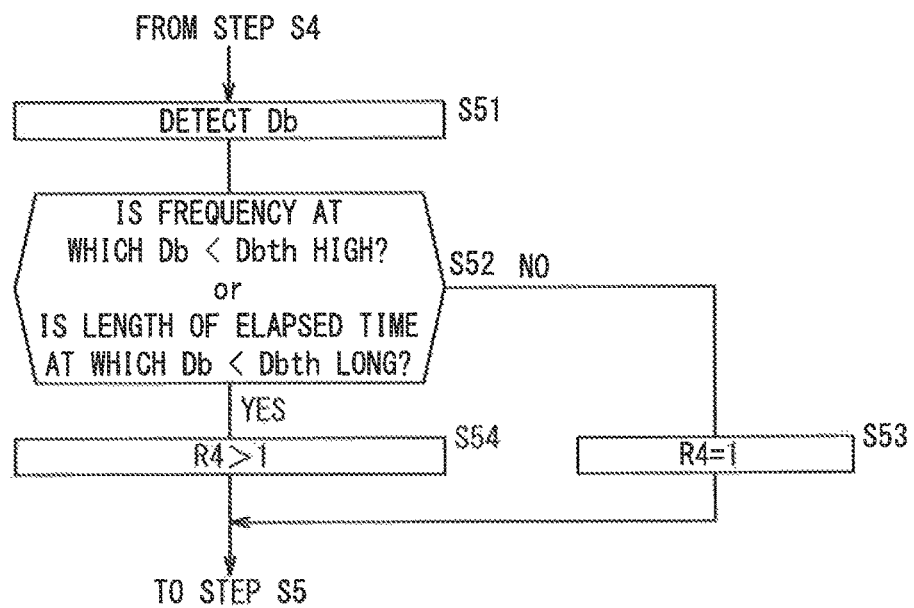
FIG. 12 is a flowchart for describing operations (in relation to a preceding vehicle inter-vehicular distance) according to a fifth modification of the first embodiment.

The processes of steps S51 through S54 shown in the flowchart of FIG. 12 are processes that take place between the process of step S4 and the process of step S5 of the flowchart shown in FIG. 4.

In step S4, as noted previously, the following vehicle inter-vehicular distance threshold Dfth corresponding to the rate of deceleration Gd of the user's own vehicle 12 is calculated.

According to the fifth modification, in step S51, the notification controller 20 acquires a preceding vehicle inter-vehicular distance Db, which is detected by the preceding vehicle inter-vehicular distance detection unit 54.

Next, in step S52, it is judged whether or not the frequency of the preceding vehicle inter-vehicular distance Db being smaller (shorter) than the preceding vehicle inter-vehicular distance threshold Dbth, which is stored beforehand in the storage unit 16, is high (Db<Dbth), or whether or not an elapsed time for which the preceding vehicle inter-vehicular distance Db is smaller (shorter) than the preceding vehicle inter-vehicular distance threshold Dbth is longer than a prescribed time interval.

If the frequency at which Db<Dbth is not high and the elapsed time is short (step S52: NO), then a preceding vehicle inter-vehicular distance ratio R4 is set to R4=1 (step S53), and the processes of step S5 and those thereafter are performed.

If the frequency at which Db<Dbth is high, or if the elapsed time is long (step S52: YES), then the preceding vehicle inter-vehicular distance ratio R4 is set to a value more than 1 (R4>1) (step S54).

As a result, the value of the following vehicle inter-vehicular distance threshold Dfth is made larger, according to the formula Dfth>Rx=Dfth×R4 (R4>1).

In accordance with the fifth modification, if it is judged that the inter-vehicular distance Db between the user's own vehicle 12 and the preceding vehicle Bv is small on average (step S52: YES), traffic congestion is assumed to exist in front of the user's own vehicle 12, and in this case, by issuing the notification quickly with respect to the following vehicle Fv, the risk of the user's own vehicle 12 being hit from behind by the following vehicle Fv can be reduced.

Further, in the fifth modification as well, in the case it is judged that the preceding vehicle inter-vehicular distance Db between the user's own vehicle 12 and the preceding vehicle Bv is small on average (step S52: YES), by setting the absolute value |Gdth| of the deceleration rate threshold Gdth so as to become smaller, the fact that the user's own vehicle 12 is decelerating significantly can be notified at an early stage. Therefore, the risk of the user's own vehicle 12 being hit from behind by the following vehicle Fv can be further reduced.

Sixth Modification of First Embodiment

Next, operations of the travel control device 10 for a vehicle according to a sixth modification of the first embodiment of the present invention will be described with reference to the flowchart of FIG. 13.

Figure 13:
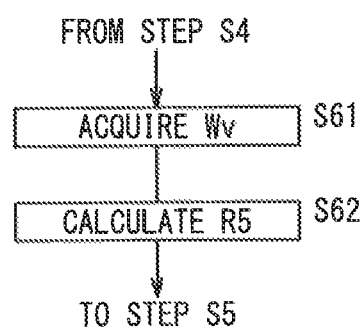
FIG. 13 is a flowchart for describing operations (in relation to vehicle weight) according to a sixth modification of the first embodiment.

The processes of steps S61 and S62 shown in the flowchart of FIG. 13 are processes that take place between the process of step S4 and the process of step S5 of the flowchart shown in FIG. 4.

In step S4, as noted previously, the following vehicle inter-vehicular distance threshold Dfth corresponding to the rate of deceleration Gd of the user's own vehicle 12 is calculated.

According to the sixth modification, next, in step S61, the notification controller 20 acquires through the vehicle weight acquisition unit 56 a corrective weight amount $\Delta W$ to be added to the vehicle weight Wv. The vehicle weight acquisition unit 56 calculates the corrective weight amount $\Delta W$ [kg] from a seat sensor, a seat belt connection sensor, a vehicle height sensor, or a front lamp automatic leveling correction amount, and outputs the detected amount to the ECU 14.

In step S61, the notification controller 20 adds the corrective weight amount $\Delta W$ [kg] to the vehicle weight Wv0, which is one of various specifications of the vehicle, to calculate the current vehicle weight Wv (Wv=Wv0+$\Delta W$).

Figure 14:
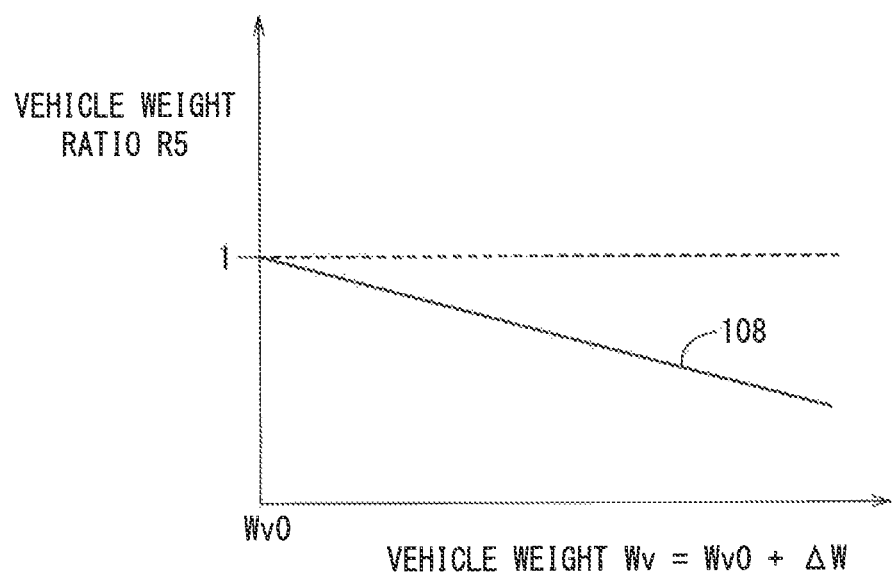
FIG. 14 is a characteristic diagram showing changes in a vehicle weight ratio with respect to the weight of the vehicle.

In step S62, the notification controller 20, with reference to the characteristic (map) 108 of the vehicle weight ratio R5 with respect to the vehicle weight Wv shown in FIG. 14, calculates the vehicle weight ratio R5 corresponding to the vehicle weight Wv.

The characteristic 108 of the vehicle weight ratio R5 is stored beforehand in the storage unit 16 with the vehicle velocity V as a parameter thereof. The characteristic 108 is set such that, taking the vehicle weight Wv0, which is one of various vehicle specifications, as a reference, the vehicle weight ratio R5 becomes smaller from the value of 1, as the vehicle weight Wv to which the corrective weight amount ΔW has been added (Wv=Wv0+ΔW) becomes greater (heavier). Stated otherwise, the characteristic 108 is set such that, as the vehicle weight Wv of the user's own vehicle 12 becomes smaller (lighter), the vehicle weight ratio R5 approaches the value of 1.

Next, in step S5, the following vehicle inter-vehicular distance threshold Dfth is set according to the formula Dfth←Dfth×Rx=Dfth×R5.

In accordance with the sixth modification, in the case that the vehicle weight Wv of the user's own vehicle 12 is light, although the accelerator pedal 40 is operated in the same way as the case in which the vehicle weight Wv is heavy, the rate of deceleration Gd becomes greater. Therefore, by setting the following vehicle inter-vehicular distance threshold value Dfth to be relatively larger, and thereby issuing a notification more quickly, the risk of the user's own vehicle 12 being hit from behind by the following vehicle Fv can be reduced.

Further, in the sixth modification as well, in the case that the vehicle weight Wv is light, by setting the absolute value |Gdth| of the deceleration rate threshold Gdth so as to become smaller, the fact that the user's own vehicle 12 is decelerating significantly can be notified at an early stage. Thus, the risk of the user's own vehicle 12 being hit from behind by the following vehicle Fv can be further reduced.

Moreover, an arbitrary number of any one or a plurality of features from the first modification to the sixth modification of the above-described first embodiment may be incorporated and used simultaneously.

Second Exemplary Embodiment

Figure 15:
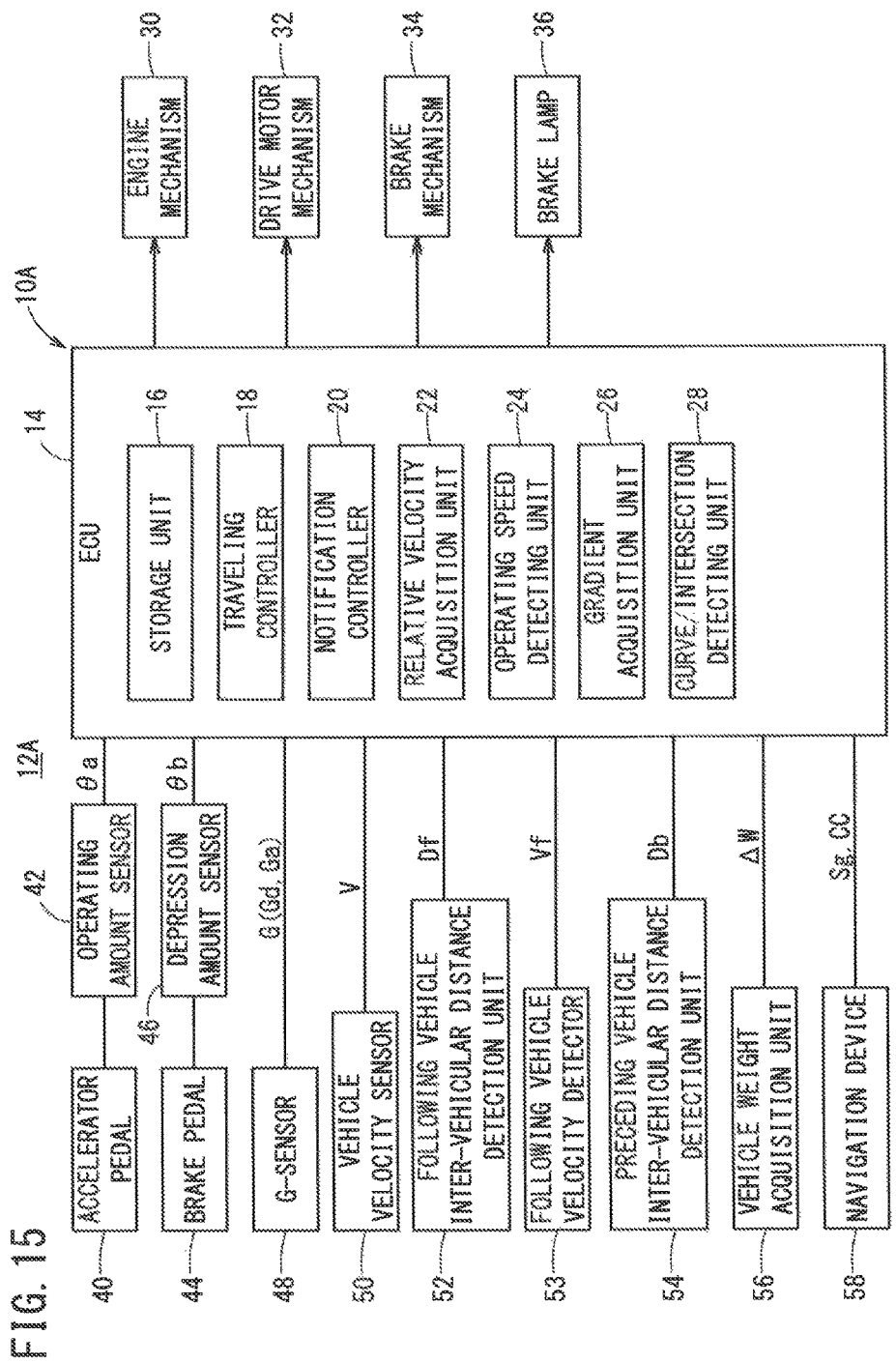
FIG. 15 is a structural block diagram shown in outline of a user's own vehicle in which there is incorporated a travel control device for a vehicle according to a second embodiment of the present invention.

FIG. 15 is a structural block diagram showing in outline a user's own vehicle 12A in which there is incorporated a travel control device 10A for a vehicle according to a second embodiment of the present invention.

In FIG. 15, the same reference characters are used to designate corresponding elements to those shown in FIG. 1, and detailed description of such features is omitted.

In comparison with the travel control device 10 for a vehicle according to the first embodiment, the travel control device 10A for a vehicle according to the second embodiment differs in that it further comprises a following vehicle velocity detector 53 and a relative velocity acquisition unit 22.

The relative velocity acquisition unit 22 acquires the relative velocity Vr between the user's own vehicle 12A and the following vehicle Fv.

The relative velocity Vr is calculated by the equation Vr=Vf−V [km/h], where the velocity of the user's own vehicle 12A, which is detected through the vehicle velocity sensor 50 of the user's own vehicle 12A is indicated as V, and the velocity of the following vehicle Fv, which is detected through the following vehicle velocity detector 53, is indicated as Vf [km/h].

The vehicle velocity Vf of the following vehicle Fv can be obtained directly by vehicle-to-vehicle communications with the following vehicle Fv using the following vehicle velocity detector 53 as a communications device, and can be obtained by road-to-vehicle communications from an infrastructure beacon.

The user's own vehicle 12A being hit from behind by the following vehicle Fv occurs only in the case that the vehicle velocity Vf of the following vehicle Fv is faster than the vehicle velocity V of the user's own vehicle 12A. Therefore, the following description is premised on the value of the relative velocity Vr being a positive value (Vr>0).

Figure 16:
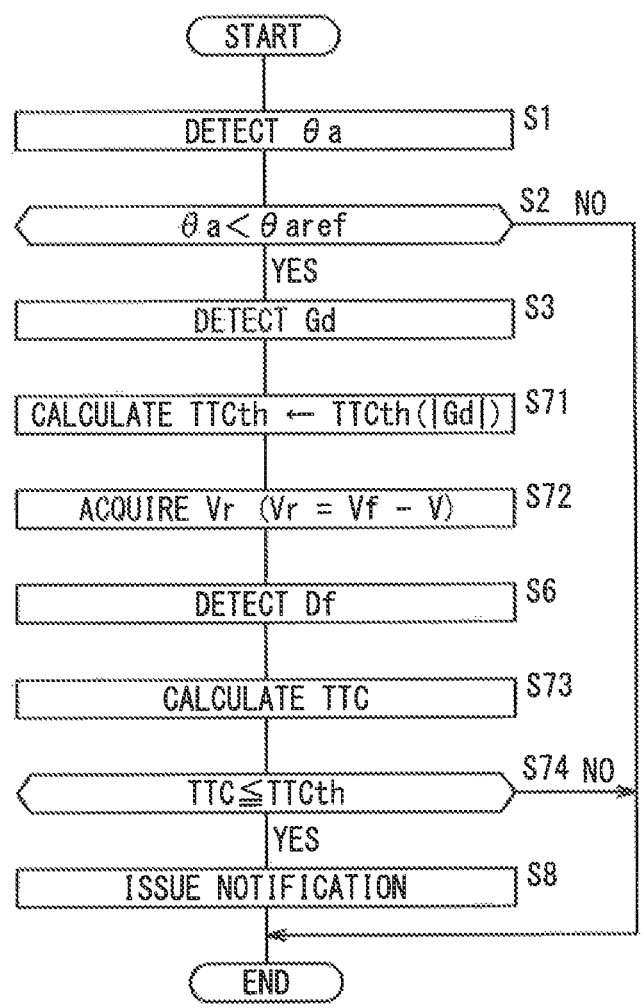
FIG. 16 is a flowchart for describing operations of the second embodiment.

Operations of the travel control device 10A for a vehicle according to the second embodiment of the present invention, which is constructed basically as described above and is incorporated in the user's own vehicle 12A, will be described with reference to the flowchart of FIG. 16. In the respective processes of the flowchart of FIG. 16, steps thereof which correspond to the respective processes of the flowchart of FIG. 4 are designated by the same step numbers, and detailed description of such features is omitted. Further, in the following description, the execution subject of the program according to the flowchart is the notification controller 20 of the ECU 14.

First, in step S1, the notification controller 20 of the user's own vehicle 12A, which is currently traveling in the condition shown in FIG. 2, detects an amount of operation θa of the accelerator pedal 40 through the operating amount sensor 42, and in step S2, detects whether or not the detected amount of operation θa lies within the deceleration region Ad (0≤θa<θaref) which is less than the reference amount of operation θaref. In the case that the amount of operation θa does not lie within the deceleration region Ad (step S2: NO), the procedure returns to step S1.

In the case that the amount of operation θa lies within the deceleration region Ad (step S2: YES), then in step S3, the notification controller 20 detects the rate of deceleration Gd of the user's own vehicle 12A through the G-sensor 48.

Figure 17:
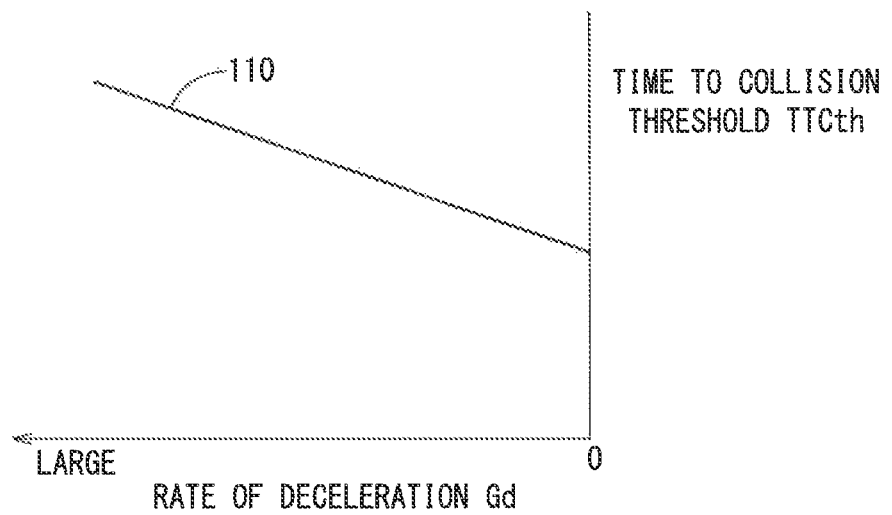
FIG. 17 is a characteristic diagram, showing changes in a time to collision threshold with respect to deceleration.

Next, in step S71, the notification controller 20, with reference to the characteristic (map) 110 of the time to collision threshold TTCth with respect to the rate of deceleration Gd shown in FIG. 17, calculates the time to collision threshold TTCth corresponding to the rate of deceleration Gd.

The characteristic 110 of the time to collision threshold TTCth is stored beforehand in the storage unit 16 with the vehicle velocity V as a parameter thereof. The characteristic 110 is set such that the time to collision threshold TTCth is made greater as the amount of operation |θaref−θa| in the one direction dr1 (see FIG. 3) by the accelerator pedal 40 becomes greater, and as the (absolute value |Gd| of the) rate of deceleration Gd becomes greater.

Next, in step S72, the notification controller 20 acquires (calculates) the relative velocity Vr (Vr=Vf−V) with respect to the following vehicle Fv, which is taken as the difference between the vehicle velocity Vf and the vehicle velocity V. The vehicle velocity Vf of the following vehicle Fv is detected through the following vehicle velocity detector 53, and the vehicle velocity V is detected by the vehicle velocity sensor 50 of the user's own vehicle 12A. In practice, in the case that the relative speed Vr assumes a negative value (Vr≤0), the procedure returns to step S1.

Next, in step S6, the notification controller 20 detects, through the following vehicle inter-vehicular distance detection unit 52, the following vehicle inter-vehicular distance Df, which is the inter-vehicular distance between the user's own vehicle 12A and the following vehicle Fv.

In addition, in step S73, the notification controller 20 calculates the time to collision TTC from the following equation (3), as is well known.

$$TTC = Df/Vr \quad (3)$$

Next, in step S74, the notification controller 20 compares sizes of the detected time to collision TTC and the time to collision threshold TTCth, and judges whether or not the time to collision TTC is smaller (shorter) than the time to collision threshold TTCth (TTC≤TTCth).

In the judgment of step S74, if the time to collision TTC is greater (longer) than the time to collision threshold TTCth (TTC>TTCth) (step S74: NO), then it is judged than a troublesome excessive notification would result, nothing is done, and the procedure returns to step S1.

On the other hand, in the judgment of step S74, if the time to collision TTC is smaller (shorter) than or equal to the time to collision threshold TTCth (TTC≤TTCth) (step S74: YES), then in step S8, the notification controller 20 issues a notification by causing the brake lamp 36 to be illuminated, thus prompting the attention of the driver, etc., of the following vehicle Fv that the user's own vehicle 12A (the vehicle in front of the following vehicle Fv) is currently in a decelerating state.

As has been described above, the travel control device 10A for a vehicle according to the aforementioned second embodiment controls the acceleration and deceleration of the user's own vehicle 12A responsive to the amount of operation θa of the accelerator pedal 40, which acts as a single operating element. More specifically, concerning the amount of operation θa, the traveling controller 18, as shown in FIG. 3, sets the deceleration region Ad corresponding to the amount of operation |θaref−θa| in the one direction dr1 by the accelerator pedal 40, and the acceleration region Aa corresponding to the amount of operation (θa−θaref) in the other direction dr2 that differs from the one direction dr1, and within the deceleration region Ad, controls the rate of deceleration Gd (target deceleration Gdtar) of the user's own vehicle 12A so as to increase as the amount of operation |θaref−θa| in the one direction dr1 becomes greater.

In addition, in the travel control device 10A for a vehicle according to the second embodiment, the notification controller 20 acquires (calculates) a time to collision TTC from the following vehicle inter-vehicular distance Df, and the relative velocity Vr between the user's own vehicle 12A and the following vehicle Fv. Additionally, in principal, in the case that the brake pedal 44 is being depressed and the user's own vehicle 12A is currently undergoing deceleration, the brake lamp 36, which acts as a notifying unit, is illuminated, and a notification is issued to the following vehicle Fv that the user's own vehicle 12A is decelerating. Furthermore, in the case it is detected that the user's own vehicle 12A is being decelerated by the accelerator pedal 40, then if the time to collision TTC becomes less than or equal to the time to collision threshold TTCth, the notification controller 20 illuminates the brake lamp 36.

In this case, the notification controller 20 is set such that the time to collision threshold TTCth is made greater, as the amount of operation |θaref−θa| in the one direction dr1 by the accelerator pedal 40 becomes greater, and as the (absolute value |Gd| of the) rate of deceleration Gd becomes greater.

According to the above-described configuration, in the user's own vehicle 12A in which acceleration and deceleration is effected with the single accelerator pedal 40, as the rate of deceleration Gd generated by the accelerator pedal 40 becomes greater, the time to collision threshold TTCth, which is compared with the time to collision TTC for carrying out notification (illuminating the brake lamp 36) with respect to the following vehicle Fv, is made larger, and therefore, a notification can be issued to the following vehicle Fv more quickly as the (absolute value |Gd| of) the rate of deceleration Gd becomes greater. Consequently, the risk of the user's own vehicle 12A being hit from behind by the following vehicle Fv can be reduced. Further, since there is no need to carry out the notification at a faster timing than necessary, an inconvenience of excessively notifying a vehicle occupant such as the driver, etc., of the following vehicle Fv can be reduced. In this manner, according to the second embodiment, in a configuration that controls acceleration and deceleration of the user's own vehicle 12A responsive to the amount of operation θa of the single accelerator pedal 40, it is possible to appropriately notify the following vehicle Fv concerning braking of the user's own vehicle 12A.

Moreover, arbitrary features of the above described first embodiment and the first modification to the sixth modification of the first embodiment may be incorporated and used simultaneously in the second embodiment.

Further, the present invention is not limited to the above-described embodiments, and various arrangements may be adopted therein based on the content disclosed in the present specification, under features such as freeway (or expressway) traveling, nighttime traveling, and traveling under bad weather conditions, etc.

At times of freeway traveling or nighttime traveling, the notification (illumination of the brake lamp 36) may occur later than usual. At times of traveling under bad weather conditions such as times of snowfall, rainfall, and fog, etc., the notification (illumination of the brake lamp 36) may occur more quickly than usual.

What is claimed is:

1. A travel control device for a vehicle for controlling acceleration and deceleration of a user's own vehicle responsive to an amount of operation of a single operating element, comprising:

a following vehicle inter-vehicular distance detection unit configured to detect a following vehicle inter-vehicular distance, which is an inter-vehicular distance between the user's own vehicle and a following vehicle;

a notifying unit configured to issue a notification to the following vehicle that the user's own vehicle is decelerating;

a notification controller configured to control issuance of the notification by the notifying unit, in a case that the user's own vehicle is being decelerated by the operating element, and when the following vehicle inter-vehicular distance becomes equal to or less than a following vehicle inter-vehicular distance threshold; and a traveling controller configured to set in relation to the amount of operation, a deceleration region corresponding to the amount of operation in one direction by the operating element, and an acceleration region corresponding to the amount of operation in another direction that differs from the one direction, and configured to, in the deceleration region, control a rate of deceleration of the user's own vehicle so as to increase as the amount of operation in the one direction becomes greater;

wherein the notification controller is configured to set the following vehicle inter-vehicular distance threshold so as to increase as the amount of operation in the one direction by the operating element becomes greater, and as the rate of deceleration becomes greater.

2. The travel control device for a vehicle according to claim 1, further comprising an operating speed detecting unit configured to detect a speed of operation in the one direction of the operating element,
wherein the notification controller is configured to set the following vehicle inter-vehicular distance threshold so as to increase as the speed of operation in the one direction detected by the operating speed detecting unit becomes greater.

3. The travel control device for a vehicle according to claim 1, wherein, on condition that it is detected that the rate of deceleration, which is generated based on the operating element being operated in the one direction, has become greater than a deceleration rate threshold, prior to the following vehicle inter-vehicular distance becoming less than or equal to the following vehicle inter-vehicular distance threshold, the notification controller carries out the notification by the notifying unit at a point in time it is detected that the rate of deceleration has become greater.

4. The travel control device for a vehicle according to claim 1, further comprising a gradient acquisition unit configured to acquire a road surface gradient, which is a gradient of a travel path along which the user's own vehicle travels;
wherein the notification controller is configured to:
in a case it is detected by the gradient acquisition unit that the travel path is an uphill path, set the following vehicle inter-vehicular distance threshold so as to decrease and/or the deceleration rate threshold so as to become larger as the road surface gradient of the uphill path becomes greater; and
in a case it is detected by the gradient acquisition unit that the travel path is a downhill path, set the following vehicle inter-vehicular distance threshold so as to increase and/or the deceleration rate threshold so as to become smaller as the road surface gradient becomes greater.

5. The travel control device for a vehicle according to claim 1, further comprising a curve/intersection detecting unit configured to detect a curve or an intersection in a forward direction of a travel path along which the user's own vehicle travels,
wherein the notification controller sets the following vehicle inter-vehicular distance threshold so as to increase and/or the deceleration rate threshold so as to become smaller, in a case it is detected by the curve/intersection detecting unit that the curve or the intersection exists in the forward direction of the travel path along which the user's own vehicle travels.

6. The travel control device for a vehicle according to claim 1, further comprising a preceding vehicle inter-vehicular distance detection unit configured to detect a preceding vehicle inter-vehicular distance, which is an inter-vehicular distance between the user's own vehicle and a preceding vehicle,
wherein the notification controller is configured to set a preceding vehicle inter-vehicular distance threshold so as to increase and/or the deceleration rate threshold so as to become smaller, in a case that a frequency of the preceding vehicle inter-vehicular distance being less than the preceding vehicle inter-vehicular distance threshold is high, or in a case that a time for which the preceding vehicle inter-vehicular distance is less than the preceding vehicle inter-vehicular distance threshold is continued for a predetermined time interval or greater.

7. The travel control device for a vehicle according to claim 1, further comprising a vehicle weight acquisition unit configured to acquire a vehicle weight of the user's own vehicle,
wherein as the vehicle weight that is acquired by the vehicle weight acquisition unit is lighter, the notification controller performs at least one of settings, for setting the following vehicle inter-vehicular distance threshold so as to increase, for setting a deceleration rate threshold so as to become smaller, and for setting a preceding vehicle inter-vehicular distance threshold so as to decrease.

8. A travel control device for a vehicle for controlling acceleration and deceleration of a user's own vehicle responsive to an amount of operation of a single operating element, comprising:
a following vehicle inter-vehicular distance detection unit configured to detect a following vehicle inter-vehicular distance, which is an inter-vehicular distance between the user's own vehicle and a following vehicle;
a relative velocity acquisition unit configured to acquire a relative velocity between the user's own vehicle and the following vehicle;
a notifying unit configured to issue a notification to the following vehicle that the user's own vehicle is decelerating;
a notification controller configured to control issuance of the notification by the notifying unit, in a case that the user's own vehicle is being decelerated by the operating element, and on condition that a time to collision, which is calculated from the following vehicle inter-vehicular distance and the relative velocity, is less than a time to collision threshold; and
a traveling controller configured to set in relation to the amount of operation, a deceleration region corresponding to the amount of operation in one direction by the operating element, and an acceleration region corresponding to the amount of operation in another direction that differs from the one direction, and configured to, in the deceleration region, control a rate of deceleration of the user's own vehicle so as to increase as the amount of operation in the one direction becomes greater;
wherein the notification controller is configured to set the time to collision threshold so as to increase as the amount of operation in the one direction by the operating element becomes greater, and as the rate of deceleration becomes greater.

* * * * *